(12) United States Patent
Dowty

(10) Patent No.: US 11,420,750 B2
(45) Date of Patent: Aug. 23, 2022

(54) CONSOLIDATED ELECTRONICS PACKAGES FOR STAGGERED AIRCRAFT SEATS

(71) Applicant: B/E AEROSPACE, INC., Winston-Salem, NC (US)

(72) Inventor: Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 143 days.

(21) Appl. No.: 16/891,919

(22) Filed: Jun. 3, 2020

(65) Prior Publication Data

US 2020/0385125 A1 Dec. 10, 2020

Related U.S. Application Data

(60) Provisional application No. 62/857,655, filed on Jun. 5, 2019.

(51) Int. Cl.
  *B64D 11/06* (2006.01)
  *B64D 11/00* (2006.01)
  *B64C 1/18* (2006.01)

(52) U.S. Cl.
  CPC ...... *B64D 11/0624* (2014.12); *B64D 11/0015* (2013.01); *B64D 11/0604* (2014.12); *B64C 1/18* (2013.01); *B64D 2011/0046* (2013.01)

(58) Field of Classification Search
  CPC ............ B64D 11/0015; B64D 11/0602; B64D 11/0627; B64D 11/0624
  See application file for complete search history.

(56) References Cited

U.S. PATENT DOCUMENTS

| | | | |
|---|---|---|---|
| 6,585,189 B1 | 7/2003 | Smallhorn | |
| 6,824,104 B2 | 11/2004 | Smallhorn | |
| 8,487,483 B2 | 7/2013 | Petrisor | |
| 2003/0132346 A1* | 7/2003 | Lambiaso | B64D 11/0015 244/118.6 |
| 2008/0149770 A1* | 6/2008 | Hoffjann | B64D 11/06395 244/122 R |

(Continued)

FOREIGN PATENT DOCUMENTS

| | | |
|---|---|---|
| DE | 102009042942 A1 | 3/2011 |
| EP | 3475167 A1 | 5/2019 |

(Continued)

*Primary Examiner* — Timothy D Collins
*Assistant Examiner* — Justin Michael Heston
(74) *Attorney, Agent, or Firm* — Suiter Swantz pc llo

(57) ABSTRACT

A set of consolidated electronics packages for staggered aircraft seats may include a first consolidated electronics package and a second consolidated electronics package. The first consolidated electronics package and a second consolidated electronics package may be installed within a primary passenger compartment. The first consolidated electronics package and the second consolidated electronics package may be configured to provide electrical connectivity to the primary passenger compartment and an auxiliary passenger compartment including an auxiliary aircraft seat. A primary aircraft seat and the auxiliary aircraft seat may be installed in a staggered configuration within an aircraft cabin including the primary passenger compartment and the auxiliary passenger compartment.

7 Claims, 11 Drawing Sheets

(56) References Cited

U.S. PATENT DOCUMENTS

| | | | |
|---|---|---|---|
| 2014/0361585 A1* | 12/2014 | Henshaw | B64D 11/0606 |
| | | | 297/174 R |
| 2015/0008706 A1* | 1/2015 | Obadia | B64D 11/064 |
| | | | 297/188.08 |
| 2017/0025803 A1 | 1/2017 | Abbinante et al. | |
| 2018/0281964 A1* | 10/2018 | Carlioz | B64D 11/0604 |
| 2019/0106216 A1 | 4/2019 | Spence | |

FOREIGN PATENT DOCUMENTS

| | | | |
|---|---|---|---|
| FR | 2823027 A1 | 10/2002 | |
| GB | 2513554 A * | 11/2014 | B64D 11/06 |

* cited by examiner

CONSOLIDATED ELECTRONICS PACKAGES FOR STAGGERED AIRCRAFT SEATS

CROSS-REFERENCE TO RELATED APPLICATIONS

The present application claims the benefit under 35 U.S.C. § 119(e) of U.S. Provisional Patent Application Ser. No. 62/857,655, filed Jun. 5, 2019, titled CONSOLIDATED ELECTRONICS PACKAGING FOR STAGGERED SEATS, naming Mark B. Dowty as inventor, which is incorporated herein by reference in the entirety.

BACKGROUND

Passenger compartments may include electronics packages for passenger compartment electronics or electronic devices. A select passenger compartment may be configured to house the electronics packages in an interior space defined within the select passenger compartment. Passengers, however, may be accustomed to using that defined interior space for personal storage. As such, housing the electronics packages within the defined interior space may remove a useful feature of the select passenger compartment for the passenger.

SUMMARY

A set of consolidated electronics packages for staggered aircraft seats is disclosed, in accordance with one or more embodiments of the disclosure. The set of consolidated electronics packages may include a first consolidated electronics package installed in a primary cavity defined within a primary ottoman of a primary passenger compartment. The primary ottoman may further define an auxiliary cavity configured as a storage space. The primary ottoman may correspond to a primary aircraft seat of the primary passenger compartment. The primary ottoman may be installed under a primary monument of the primary passenger compartment. The set of consolidated electronics packages may include a second consolidated electronics package installed within a cavity defined between a surface of a structure within the primary passenger compartment and a floor of the primary passenger compartment. The first consolidated electronics package and the second consolidated electronics package may be configured to provide electrical connectivity to the primary passenger compartment and an auxiliary passenger compartment. The auxiliary passenger compartment may include an auxiliary aircraft seat. The primary aircraft seat and the auxiliary aircraft seat may be installed in a staggered configuration within an aircraft cabin including the primary passenger compartment and the auxiliary passenger compartment.

In some embodiments, the structure may include a primary storage compartment. The cavity may be defined between a bottom floor of the primary storage compartment of the primary passenger compartment and the floor of the primary passenger compartment. The primary storage compartment may be positioned proximate to the primary ottoman and the primary monument.

In some embodiments, the cavity defined between the bottom floor of the primary storage compartment and the floor of the passenger compartment may be covered by a shield configured to prevent access to the second consolidated electronics package.

In some embodiments, the primary cavity defined within the primary ottoman and the auxiliary cavity defined within the primary ottoman may be covered by a shield.

In some embodiments, the primary cavity defined within the primary ottoman may be separated from the auxiliary cavity defined within the primary ottoman by a plate configured to prevent access to the first consolidated electronics package in the primary cavity.

In some embodiments, the first consolidated electronics package may include a power box for in-flight entertainment devices installed within the primary passenger compartment and the auxiliary passenger compartment. The second consolidated electronics package may include a power box for actuation devices of components installed within the primary passenger compartment and the auxiliary passenger compartment.

In some embodiments, the auxiliary passenger compartment may include an auxiliary ottoman corresponding to the auxiliary aircraft seat. The auxiliary ottoman may be installed under an auxiliary monument within the primary passenger compartment and positioned proximate to the primary aircraft seat.

A set of consolidated electronics packages for staggered aircraft seats is disclosed, in accordance with one or more embodiments of the disclosure. The set of consolidated electronics packages may include a first consolidated electronics package and a second consolidated electronics package installed in a floor area within a primary passenger compartment. The primary passenger compartment may include a primary aircraft seat and a primary ottoman corresponding to the primary aircraft seat. The primary ottoman may be installed under a primary monument of the primary passenger compartment. The first consolidated electronics package and the second consolidated electronics package may be configured to provide electrical connectivity to the primary passenger compartment and an auxiliary passenger compartment. The auxiliary passenger compartment may include an auxiliary aircraft seat. The primary aircraft seat and the auxiliary aircraft seat may be installed in a staggered configuration within an aircraft cabin including the primary passenger compartment and the auxiliary passenger compartment.

In some embodiments, a location of the floor area within the primary passenger compartment may be selected to not block an egress into an aisle of the aircraft cabin from the primary passenger compartment.

In some embodiments, the floor area may be defined between an auxiliary monument and a primary storage compartment within the primary passenger compartment. The primary storage compartment may be positioned proximate to the primary ottoman and the primary monument.

In some embodiments, the first consolidated electronics package may include a power box for actuation devices of components installed within the first passenger compartment and the second passenger compartment. The second consolidated electronics package may include a power box for in-flight entertainment devices installed within the first passenger compartment and the second passenger compartment.

In some embodiments, at least one of the first consolidated electronics package or the second consolidated electronics package may be coupled to a frame.

In some embodiments, the first consolidated electronics package and the second consolidated electronics package may be covered by a shield.

In some embodiments, the first consolidated electronics package may be coupled to the second consolidated electronics package. The second consolidated electronics package may be coupled to the frame.

In some embodiments, the frame may be coupled to at least one cross-member within the primary passenger compartment.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
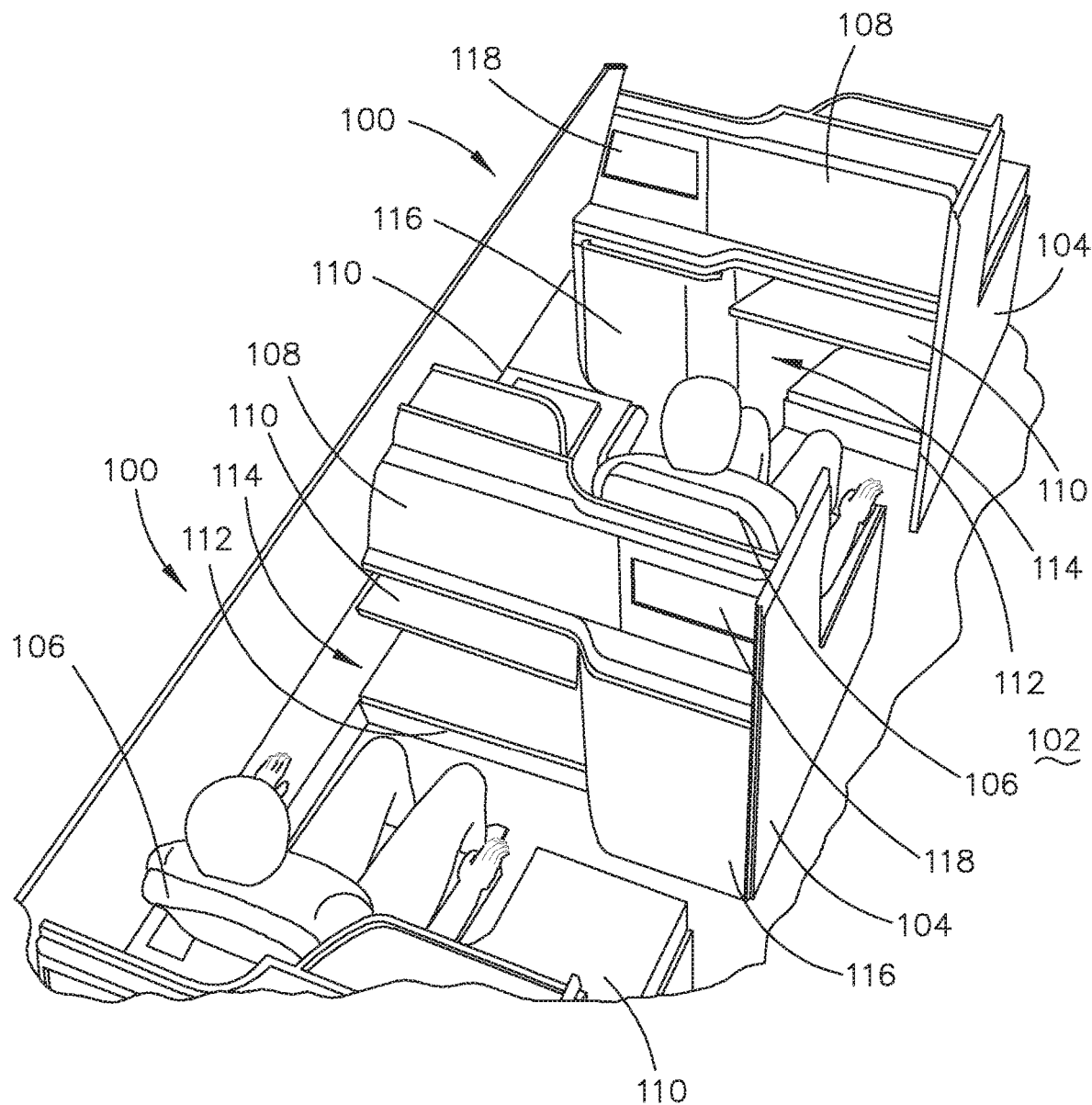
FIG. 1 illustrates a perspective view of a set of passenger compartments including staggered aircraft seats, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b ). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-4E in general illustrate consolidated electronics packages for staggered aircraft seats, in accordance with one or more embodiments of the disclosure.

Passenger compartments within an aircraft cabin may include electronics packages for passenger compartment electronics or electronic devices. A select passenger compartment may include lowered monuments and/or structures to provide an increased clearance to a passenger footwell within the select passenger compartment. The lowering of the monuments or structures, however, may result in a reduction or loss of space underneath or within the lowered monuments and/or structures, such that the electronics packages may need to be relocated within the select passenger compartment.

In one example, the select passenger compartment may be configured to house the electronics packages in an interior space defined within the select passenger compartment. For example, the interior space may be defined within an ottoman installed in the select passenger compartment. That interior space, however, may be otherwise usable as storage for belongings of a passenger occupying the select passenger compartment (e.g., passengers may be accustomed to using that defined interior space for personal storage), as storage for onboard emergency supplies for the select passenger compartment or other passenger compartments within the aircraft cabin, or the like. As such, housing the electronics packages within the defined interior space, such as that within the ottoman, may remove a useful feature of the select passenger compartment for the passenger occupying the passenger compartment, the crew members, other passengers, or the like.

Therefore, it would be desirable to provide passenger compartments with consolidated electronics packages. The consolidated electronics packages should be located within the passenger compartments (and the aircraft cabin in general) to reduce the loss of defined interior spaces usable for storage while maintaining an egress to an aisle of the aircraft cabin. The consolidated electronics packages should be located within the passenger compartments while still allowing for lowered monuments and/or structures to provide an increased clearance to passenger footwells within the passenger compartments. The consolidated electronics packages should reduce part count, fabrication cost, and/or installation cost in the passenger compartments (and the aircraft cabin in general).

FIG. 1 illustrates one or more passenger compartments 100, in accordance with one or more embodiments of the disclosure. It is noted herein the one or more passenger compartments 100 may be installed within an aircraft cabin 102 of a passenger aircraft.

A passenger compartment 100 may include a privacy shell 104 with one or more privacy shell elements. The privacy shell 104 may include an opening within the one or more privacy shell elements into the passenger compartment 100, the opening configured to lead to an aisle of the aircraft cabin 102. The passenger compartment 100 may include a door for the opening. For example, the door may swing or slide into an open position against the one or more privacy shell elements. By way of another example, one or more privacy shell elements may be at least partially hollow, and the door may be slid into a cavity defined in the one or more privacy shell elements.

A passenger compartment 100 may include one or more aircraft seats 106. In general, an aircraft seat 106 may be translatable (e.g., trackable or slidable). The aircraft seat 106 may be rotatable about an axis cross-wise through the aircraft seat 106 into a position including, but not limited to, an upright or raised position, one or more lounge or reclined positions, and a lie-flat or bed position. For example, the aircraft seat 106 may transition directly between the upright position and the lie-flat or bed position. By way of another example, it is noted herein the aircraft seat 106 may transition through one or more reclined positions between the upright position and the lie-flat or bed position. By way of another example, the aircraft seat 106 may transition into one or more reclined positions in a motion separate from the transition between the upright position and the lie-flat or bed position. Therefore, the above description should not be interpreted as a limitation on the scope of the disclosure but merely an illustration.

The aircraft seat 106 may be rotatable about an axis (e.g., swivelable). The aircraft seat 106 may be fully positionable between the outer limits of motion as defined by the moveable components of the aircraft seat 106, one or more primary monuments 108, and/or one or more auxiliary monuments 110 of the passenger compartment 100. It is noted herein a upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 106 may be actuatable (e.g., translatable and/or rotatable) from the TTOL position to a non-TTOL position, and/or vice versa. Further, it is noted herein the aircraft seat 106 may be capable of a fully upright or raised position, and that the TTOL position may have a more reclined seat back cushion and a more angled upward seat pan cushion as compared to the fully upright or raised position. Therefore, the above description should not be interpreted as a limitation on the present disclosure but merely an illustration.

The aircraft seat 106 may be configured to avoid contact with the one or more primary monuments 108 when transitioning between positions (e.g., between the upright or raised position and the lie-flat or bed position). The one or more primary monuments 108 may include or may be implemented as a divider panel or structure separating adjacent passenger compartments 100 or separating a passenger compartment 100 from an open area within the aircraft cabin 102. For example, where the one or more primary monuments 108 are implemented as separators, the one or more primary monuments 108 may be configured to allow for the multiple passenger compartments 100 to be installed within the aircraft cabin 100 in a more compact arrangement. In this regard, the amount of aircraft cabin 102 floor area necessary for the one or more passenger compartments 100 may be reduced.

The one or more auxiliary monuments 110 may include, but are not limited to, a tray or table, a side stand, or the like. The aircraft seat 106 may be configured to avoid contact with the one or more auxiliary monuments 110 when transitioning between positions (e.g., between the upright or raised position and the lie-flat or bed position).

The auxiliary monument 110 may include a top surface, a bottom surface, and/or one or more side surfaces. For example, the auxiliary monument 110 may include a single continuous side surface where all corners are rounded. By way of another example, the auxiliary monument 110 may include up to an N number of side surfaces where the auxiliary monument 110 includes up to an N number of corners. The auxiliary monument 110 may be fixed in position. It is noted herein, however, that the auxiliary monument 110 may be actuatable (e.g., may extend a select distance from a stored position to an extended position proximate to a passenger, similar to an aircraft tray table).

The auxiliary monument 110 may be proximate to a different primary monument 108 used as a separator between adjacent passenger compartments 100 and/or between a passenger compartment 100 and an open area within the aircraft cabin 102. For example, the auxiliary monument 110 may be positioned above a primary monument 108. The auxiliary monument 110 may be integrated into the primary monument 108 used as a separator between adjacent passenger compartments 100 and/or between a passenger compartment 100 and an open area within the aircraft cabin 102. In this regard, the amount of aircraft cabin 102 floor area necessary for the one or more passenger compartments 100 may be reduced.

It is noted herein that at least some components of the passenger compartment 100 (e.g., at least a portion of the privacy shell 104, a primary monument 108, an auxiliary monument 110, or the like) may conform to a portion of an aircraft seat 106. In this regard, the amount of aircraft cabin 102 floor area necessary for the one or more passenger compartments 100 may be reduced.

The aircraft seat 106 may be proximate to an ottoman 112. The aircraft seat 106 and the ottoman 112 may form the lie-flat surface when the aircraft seat 106 and the ottoman 112 are each in a lie-flat or bed position. The ottoman 112 may be positioned underneath and/or proximate to at least some of the one or more primary monuments 108 and/or the one or more auxiliary monuments 110.

The ottoman 112 may be positioned within a footwell 114 of the passenger compartment 100. For instance, one or more dimensions of the footwell 114 may be changed by transitioning the aircraft seat 106 between the upright or raised position, a lounge or reclined position, and the lie-flat or bed position. It is noted herein that a portion of the ottoman 112 may be actuatable (e.g., along a set of tracks or linear rails) to a position outside of the footwell 114.

The ottoman 112 may be configured to translate and/or rotate about an axis through a sidewall of the ottoman to point a top surface to a passenger occupying the aircraft seat 106. For example, where the ottoman 112 may be configured to both translate and rotate, the ottoman 112 may be configured to independently rotate and/or translate. By way of another example, where the ottoman 112 may be configured to both translate and rotate, a rotation may prevent further translation until the ottoman 112 is returned to a select position and/or a translation may prevent further rotation until the ottoman 112 is returned to a select position.

It is noted herein, however, the aircraft seat 106 and/or the ottoman 112 may be limited to an upright or raised position and/or one or more lounge or reclined positions. In addition, it is noted herein the aircraft seat 106 may be the sole component forming a bed when the aircraft seat 106 is in a lie-flat or bed position. Therefore, the above description should not be interpreted as a limitation on the present disclosure but merely an illustration.

The passenger compartment 100 may include one or more storage compartments 116. The one or more storage compartments 116 may be positioned proximate to or integrated within the one or more privacy shell elements of the privacy shell 104, the one or more primary monuments 108, the one or more auxiliary monuments 110, or the like. The one or more storage compartments 116 may be coupled to and/or at least be partially inset in the one or more privacy shell elements of the privacy shell 104, the one or more primary monuments 108, the one or more auxiliary monuments 110, or the like.

A storage compartment 116 may be a storage compartment (e.g., a wardrobe) configured to receive long and/or large items (e.g., passenger amenities needing to be hung, carry-on luggage, or the like) that require an increased space and/or that a passenger may prefer to store in a substantially vertical or upright orientation.

A storage compartment 116 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

A storage compartment 116 may include one or more electronic connections for one or more passenger amenities such as, but not limited to, one or more charging ports, one or more charging cables, or the like.

A storage compartment 116 may include one or more electronic connections in communication with one or more components of the passenger compartment 100 such as, but not limited to, one or more display device connection ports, one or more display device connection cables, one or more audio output jacks (e.g., headphone jacks), one or more audio input jacks, or the like.

A storage compartment 116 may include one or more safety devices (e.g., air masks, personal floatation devices, or the like).

It is noted herein the position of the storage compartment 116 is not limited to the locations within the passenger compartment 100 as illustrated in FIGS. 1-4E, and that the storage compartment 116 may be positioned within the passenger compartment 100 in locations different from those illustrated in FIGS. 1-4E. In addition, it is noted herein the passenger compartment 100 may not include a storage compartment 116. Therefore, the above description should not be interpreted as a limitation on the present disclosure but merely an illustration.

The passenger compartment 100 may include one or more electronics or electronic devices. For example, the one or more electronics or electronic devices may include, but are not limited to, one or more aircraft seat 106 actuation devices (e.g., assemblies, controls, actuators, and/or the like), one or more in-flight entertainment (IFE) devices, one or more speakers configured to provide media content separate from or accompanying the media content shown on the in-flight entertainment (IFE) devices, one or more lights, or the like.

FIGS. 2A-4E in general illustrate a positioning of one or more consolidated electronics packages within a passenger compartment, in accordance with one or more embodiments of the disclosure.

Figure 2A:
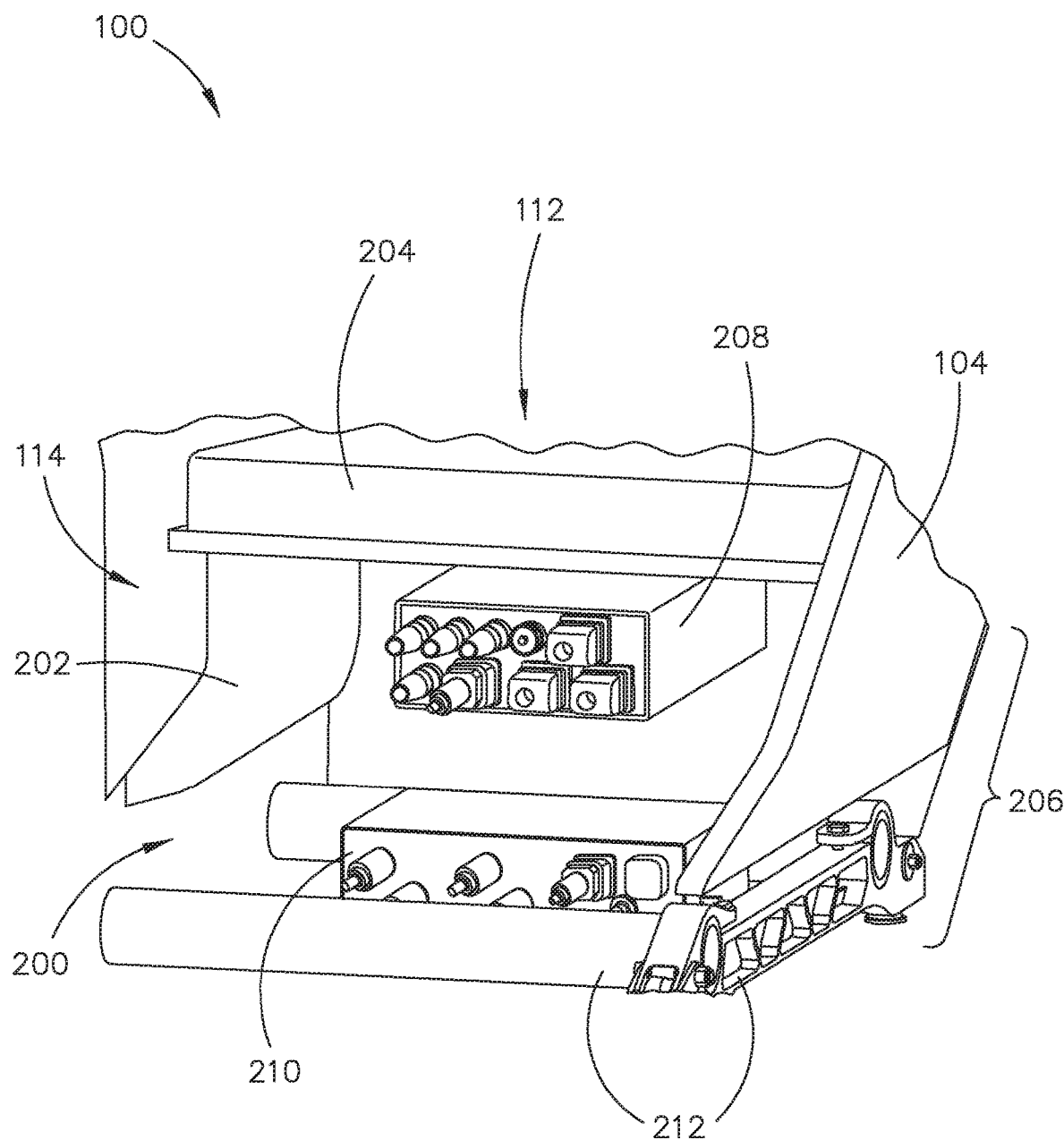
FIG. 2A illustrates a partial perspective view of an ottoman including consolidated electronics packages for staggered aircraft seats, in accordance with one or more embodiments of the disclosure.
Figure 2B:
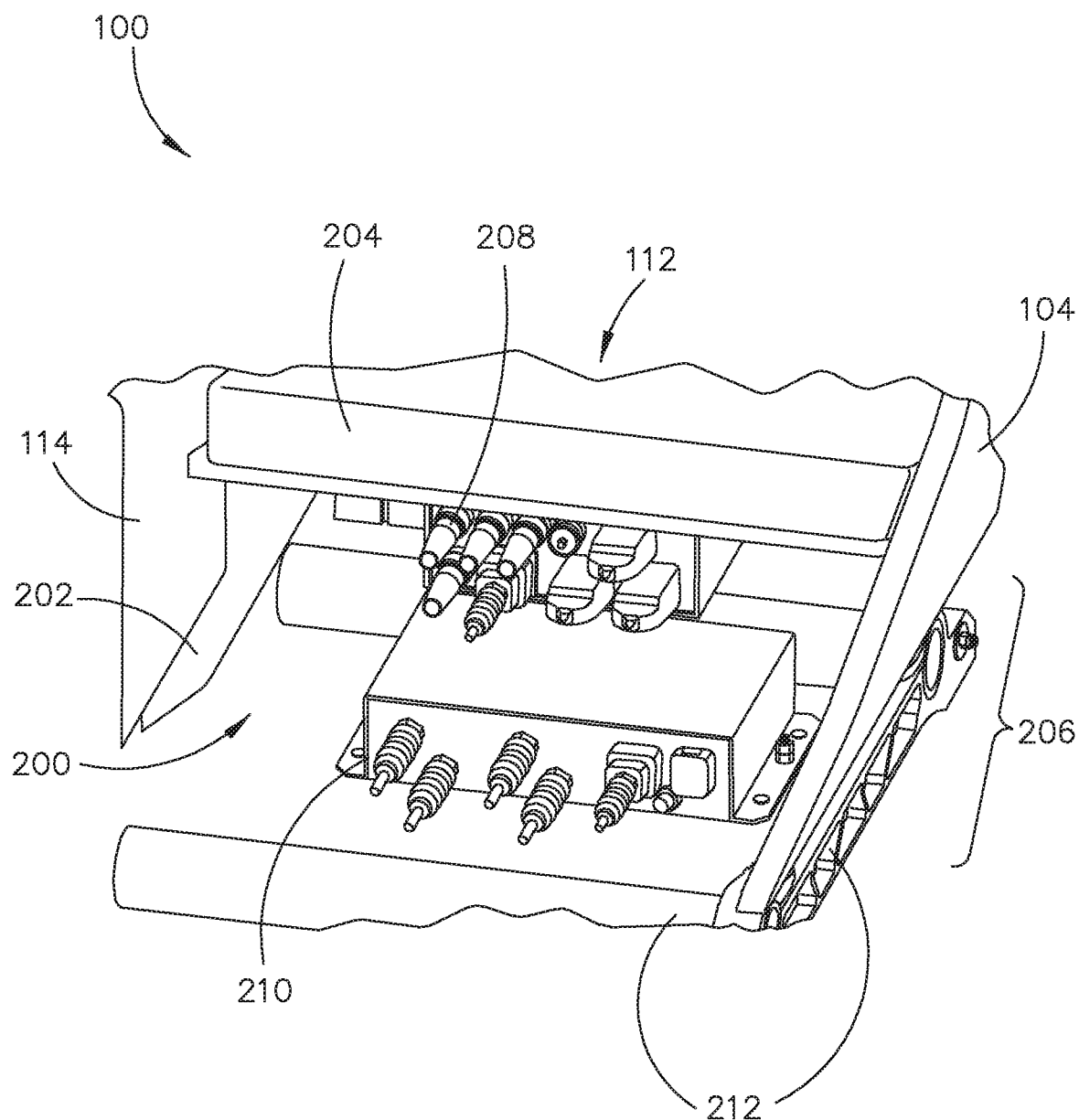
FIG. 2B illustrates a partial perspective view of an ottoman including consolidated electronics packages for staggered aircraft seats, in accordance with one or more embodiments of the disclosure.
Figure 2C:
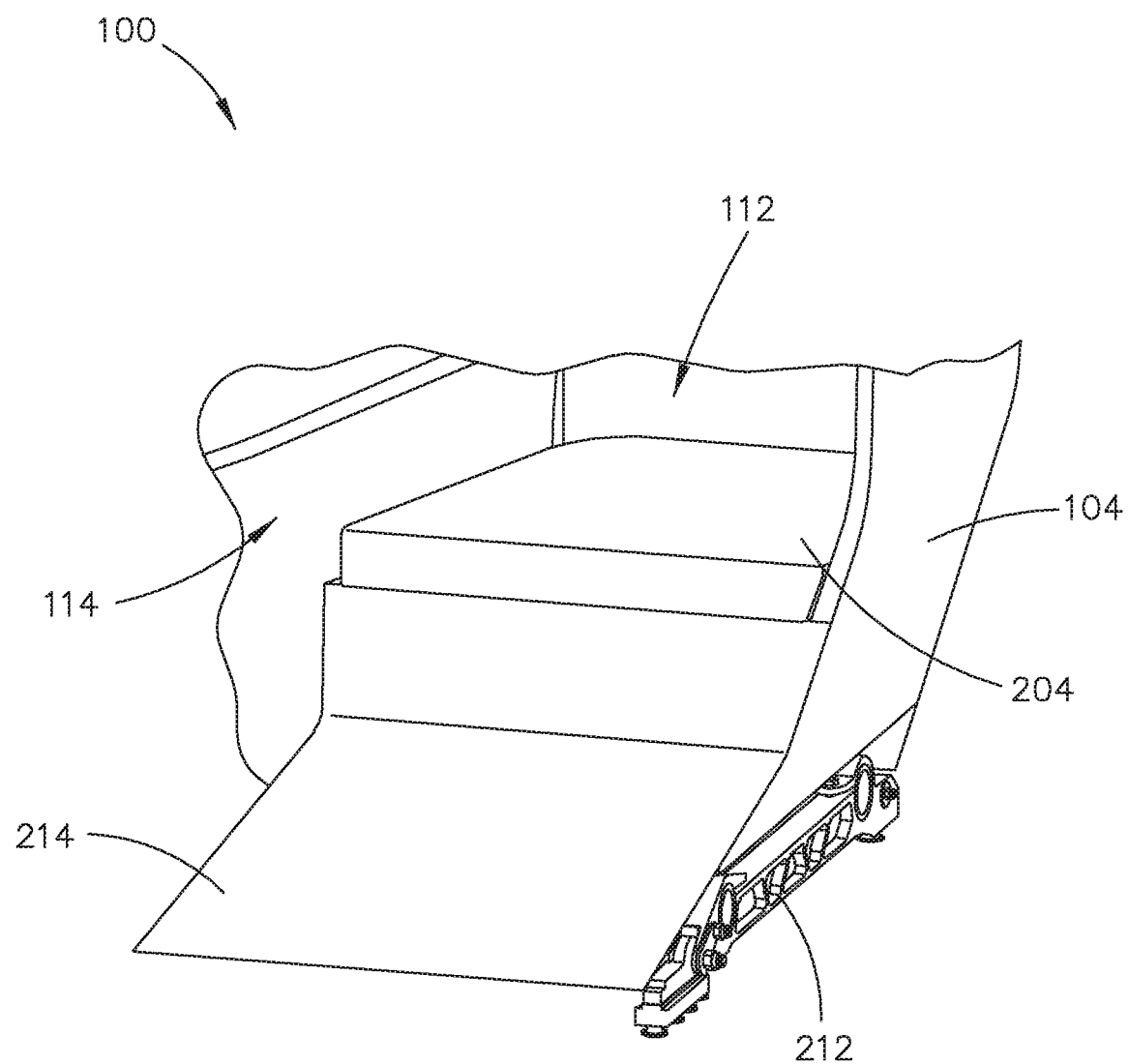
FIG. 2C illustrates a perspective view of an ottoman including consolidated electronics packages for staggered aircraft seats, in accordance with one or more embodiments of the disclosure.

Referring now to FIGS. 2A-2C, the one or more electronics packages 206 may be installed in a cavity 200. For example, the cavity 200 may be defined within the ottoman 112. For instance, the one or more electronics packages 206 may be installed in the cavity 200 defined within the ottoman 112 in response to a designing of the footwell 114 to have an increased amount of clearance. The cavity 200 may be defined within a frame 202 and/or by an ottoman cushion 204 of the ottoman 112.

The aircraft cabin 102 may include one or more electronics packages 206. For example, the one or more electronics packages 206 may include, but are not limited to, a power box 208 for IFE devices installed within the one or more passenger compartments 100, a power box 210 for actuation devices installed within the one or more passenger compartments 100, or other electronics packages. The one or more electronics packages 206 may be configured to couple to electronics or electronic devices within the one or more passenger compartments 100. For example, an electronics package 206 (or set of electronics packages 206) may be configured to couple to electronics or electronic devices installed within two rows of passenger compartments 100. In this regard, the one or more electronics packages 206 may be considered "consolidated," as they include connections for multiple passenger compartments 100. It is noted herein that "electronics packages 206" may be considered equivalent to "consolidated electronics packages 206" or variants thereof, for purposes of the disclosure.

The one or more electronics packages 206 may be coupled to a cross-member or frame 212. The cross-member or frame 212 may be coupled to one or more of an aircraft seat 106, a primary monument 108, an auxiliary monument 110, a storage compartment 116, or other structure within the passenger compartment 100.

Installing the one or more electronics packages 206 within the cavity 200 of a passenger compartment 100 may result in the cavity 200 not being usable by the passenger as a storage space. The cavity 200 may be covered or protected by a plate or shield 214. The plate or shield 214 may prevent access by a passenger or other non-authorized individual to the cavity 200. In this regard, the passenger or other non-authorized individual may not interfere with the operation of the one or more electronics packages 206, but also may not use the cavity 200 as a storage space.

It is noted herein, in an example embodiment where the passenger compartment 100 includes a storage compartment 116, the installation of the one or more electronics packages 206 within the cavity 200 may allow for the entire stand-alone storage compartment 116, as illustrated in at least FIG. 1, to be configured as a full wardrobe-like storage compartment.

Figure 3A:
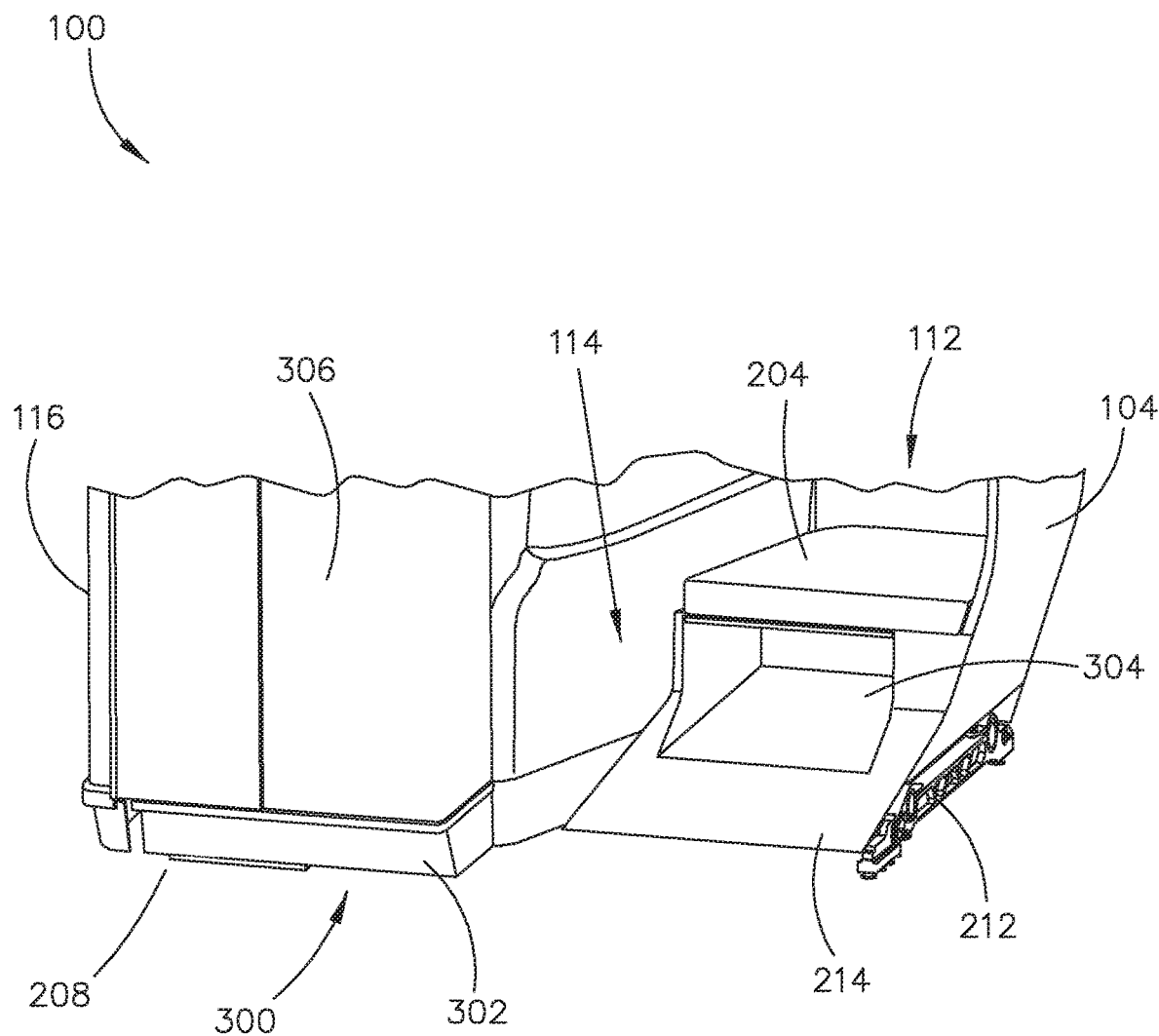
FIG. 3A illustrates a partial perspective view of a passenger compartment including consolidated electronics packages for staggered aircraft seats, in accordance with one or more embodiments of the disclosure.
Figure 3B:
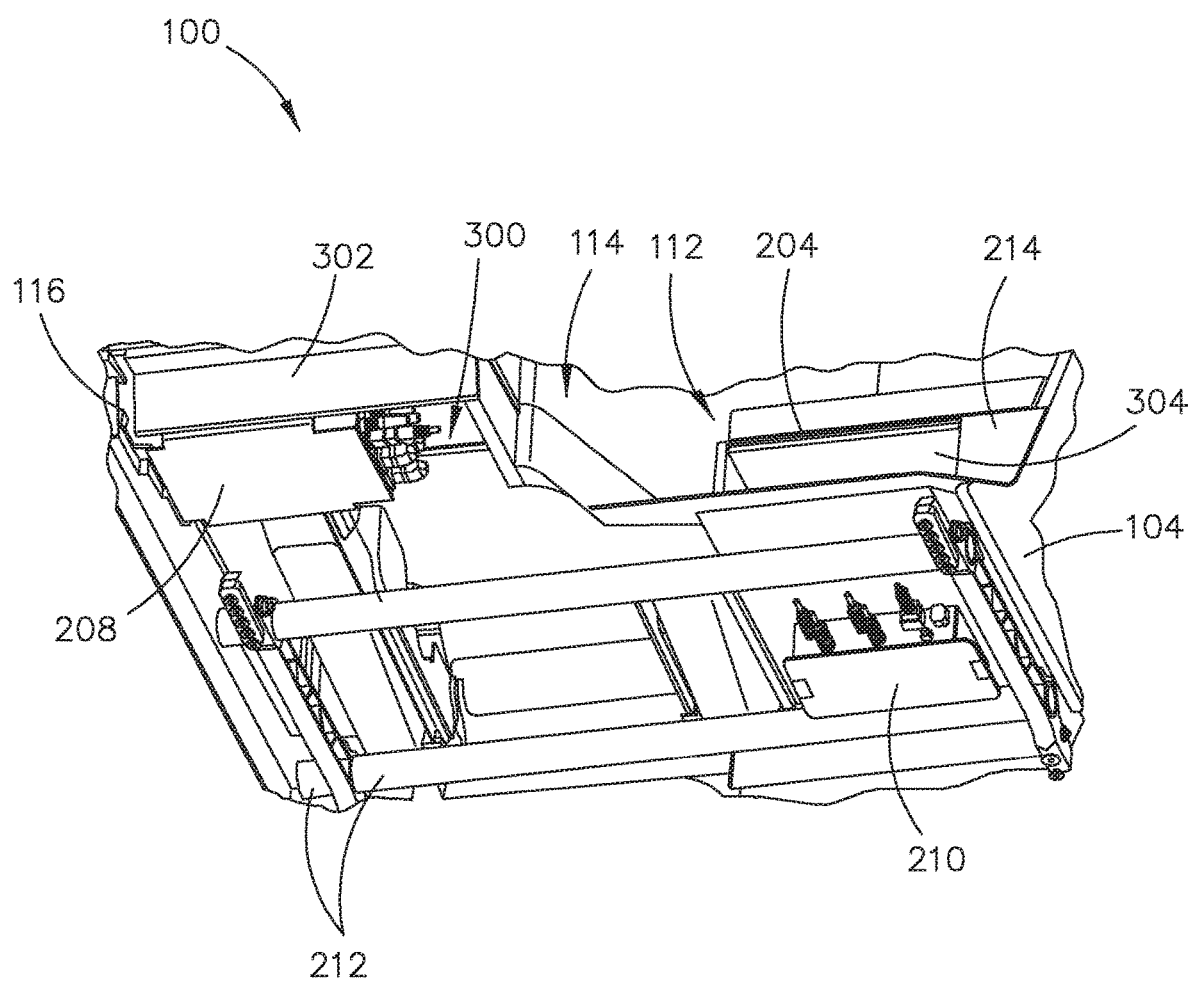
FIG. 3B illustrates a partial perspective view of an underside of a passenger compartment including consolidated electronics packages for staggered aircraft seats, in accordance with one or more embodiments of the disclosure.

Referring now to FIGS. 3A and 3B, the passenger compartment 100 may include a cavity 300. For example, the storage compartment 116 of the passenger compartment 100 may define a cavity 300. For instance, the cavity 300 may be defined between a bottom floor or surface of the storage compartment 116 and the aircraft cabin 102 floor area. By way of another example, the cavity 300 may be defined between the aircraft cabin 102 floor area and a surface of a structure of the passenger compartment 100 including, but not limited to, a primary monument 108, an auxiliary monument 110, an aircraft seat 106, or other structure within the passenger compartment 100.

The one or more electronics packages 206 may be installed within the cavity 300. For example, a subset of the one or more electronics packages 206 may be installed in the cavity 200, and a subset of the one or more electronics packages 206 may be installed in the cavity 300. For instance, a power box 208 for IFE devices may be installed within the cavity 300, and a power box 210 for actuation devices may be installed within the cavity 200. It is noted herein, however, that the arrangement of the one or more electronics packages 206 is not limited to the description above. Therefore, the above description should not be interpreted as a limitation on the present disclosure but merely an illustration.

The cavity 300 may be covered or protected by a plate or shield 302. The plate or shield 302 may prevent access by a passenger or other non-authorized individual to the cavity 300. In this regard, the passenger or other non-authorized individual may not interfere with the operation of the subset of the one or more electronics packages 206.

The ottoman 112 may include an auxiliary cavity 304. The auxiliary cavity 304 may be further defined within the cavity 200. For example, the ottoman 112 may include structures within the cavity 200 configured to define the auxiliary cavity 304, such that there is a first portion of the cavity 200 (e.g., a portion usable for storage) and a second portion of the cavity 200 (e.g., the auxiliary cavity 304). It is noted herein, however, that the auxiliary cavity 304 and the cavity 200 may be the same cavity. Therefore, the above description should not be interpreted as a limitation on the present disclosure but merely an illustration.

The auxiliary cavity 304 may be covered or protected by the plate or shield 214. Where the auxiliary cavity 304 is separate from the cavity 200, the auxiliary cavity 304 may be covered or protected by an auxiliary plate or shield separate from (e.g., instead of or in addition to) the plate or shield 214. The auxiliary plate or shield may prevent access by a passenger or other non-authorized individual to the auxiliary cavity 304. In this regard, the passenger or other non-authorized individual may not interfere with the operation of the one or more electronics packages 206, but also may not use the auxiliary cavity 304 as a storage space.

In this regard, in an example embodiment where the passenger compartment 100 includes a storage compartment 116, little or no storage space within the storage compartment 116 may be lost to the installation of the one or more electronics packages 206. In addition, an amount of storage space may be retained within the ottoman 112 (e.g., the first portion of the cavity 200), as opposed to the arrangement illustrated in FIGS. 2A-2C.

In an example embodiment where the passenger compartment 100 includes a storage compartment 116, the storage compartment 116 may include one or more doors 306. For example, the storage compartment 116 with one or more doors 306 may be a storage compartment configured to receive long and/or large items (e.g., passenger amenities needing to be hung, carry-on luggage, or the like) that require an increased space and/or that a passenger may prefer to store in a substantially vertical or upright orientation.

The one or more doors 306 may be hinged or otherwise configured to rotate or pivot about an axis. The one or more doors 306 may be configured to slide into a cavity defined within the privacy shell 104. The one or more doors 306 may be configured to collapse (e.g., via rolling/sliding slats similar to a tambour door, via an accordion fold, or the like) when opened.

It is noted herein, however, that the one or more doors 306 may not be fixed or rigid (e.g., may be a curtain, or the like). In addition, it is noted herein that the storage compartment 116 may be open to the passenger compartment 100, such that there are no doors 306. Further, it is noted herein the storage compartment 116 may instead be replaced by a primary monument 108, auxiliary monument 110, or other component of the passenger compartment 100. Therefore, the above description should not be interpreted as a limitation on the scope of the disclosure but merely an illustration.

Referring now to FIGS. 4A-4E, the aircraft cabin 102 may include a floor area 400. In general, the floor area 400 may be any floor area within a passenger compartment 100 or between adjacent passenger compartments 100. For example, where the passenger compartment 100 includes a storage compartment 116, the floor area 400 may be defined between a monument 108 and the storage compartment 116. By way of another example, the floor area 400 may be defined between two monuments including, but not limited to, two primary monuments 108, two auxiliary monuments 110, or a combination of primary monuments 108 and auxiliary monuments 110. By way of another example, the floor area 400 may be defined between a monument 108 and an aircraft seat 106. By way of another example, the floor area 400 may be defined between two aircraft seats 106.

The one or more electronics packages 206 may be installed in the floor area 400. For example, where there are multiple electronics packages 206, the multiple electronics packages may be stacked within the floor area 400 such that the multiple electronics packages occupy the same portion of the floor area 400. By way of another example, where there are multiple electronics packages 206, the electronics packages 206 may be occupy separate portions of the floor area 400.

The one or more electronics packages 206 may be coupled to a frame 402 within the floor area 400. The frame 402 may be coupled to one or more of an aircraft seat 106, a primary monument 108, an auxiliary monument 110, a storage compartment 116, or other structure within the passenger compartment 100. For example, the frame 402 may be coupled to a cross-member or separate frame 212 configured to support a corresponding aircraft seat 106, primary monument 108, auxiliary monument 110, storage compartment 116, or other structure within the passenger compartment 100.

The one or more electronics packages 206 may be covered or protected by a plate or shield 404 configured to fit within the floor area 400. The plate or shield 400 may prevent access by a passenger or other non-authorized individual to the one or more electronics packages 206. In this regard, the passenger or other non-authorized individual may not interfere with the operation of the one or more electronics packages 206.

Although embodiments of the disclosure illustrate a plate or shield 404 that is separate from other structures within the passenger compartment 100, it is noted herein a structure within the passenger compartment 100 including, but not limited to, a primary monument 108 and/or an auxiliary monument 110, or the like may be extended to cover the one or more electronics packages 206 within the floor area 400, such that the separate plate or shield 404 may not be necessary. Therefore, the above description should not be interpreted as a limitation on the present disclosure but merely an illustration.

In this arrangement of the one or more electronics packages 206, an amount of storage space may be retained within the ottoman 112, as opposed to the arrangement illustrated in FIGS. 2A-2C. In addition, little or no storage space within the storage compartment 116 may be lost (e.g., in an example embodiment where the passenger compartment 100 includes a storage compartment 116, the floor of the storage compartment 116 may be lower than the height of the frame 402 and/or the plate or shield 404).

In an example embodiment where the passenger compartment 100 includes a storage compartment 116 with one or more doors 306, the installation of the one or more electronics packages 206 within the floor area 400 may affect the one or more doors 306 of the storage compartment 116. For example, a height of the one or more doors 306 may be dependent on the arrangement of the one or more consolidated electronics packages 206 within the floor area 400. For instance, the one or more doors 306 may be shortened by a height 406, where the height 406 is approximate to a combined set of dimensions (e.g., heights or thicknesses) of the one or more electronics packages 206.

Although embodiments of the disclosure illustrate little or no storage space being lost within the storage compartment 116, in an example embodiment where the passenger compartment 100 includes a storage compartment 116, it is noted herein that the installation of the one or more electronics packages 206 within the floor area 400 may affect the available storage space within the storage compartment 116. For example, a volume of the storage within the storage compartment 116 may be dependent on the arrangement of the one or more consolidated electronics packages 206 within the floor area 400. For instance, the storage space within the storage compartment 116 may be decreased by a volume having the height 406, as the floor of the storage compartment 116 may be set at the height of the frame 402 and/or the plate or shield 404. Therefore, the above description should not be interpreted as a limitation on the present disclosure but merely an illustration.

It is noted herein the installation of the one or more electronics packages 206 within the floor area 400 may require the one or more electronics packages 206 and the surrounding structures of the passenger compartment 100 to be separately installed and electrically connected during installation within the aircraft cabin 102, as opposed to the one or more electronics packages 206 and the surrounding structures of the passenger compartment 100 being pre-constructed prior to installation (e.g., as illustrated in FIGS. 2A-2C and/or 3A-3B).

Although embodiments of the disclosure illustrate all of the one or more electronics packages 206 being installed within the floor area 400, it is noted herein that a subset of the one or more electronics packages 206 may be installed in the cavity 200, and a subset of the one or more electronics packages 206 may be installed in the floor area 400. As such, the arrangement of the one or more electronics packages 206 is not limited to the description above, and the above description should not be interpreted as a limitation on the present disclosure but merely an illustration.

Instances of the floor area 400 may be limited within the aircraft cabin 102 so that the one or more consolidated electronics packages 206 do not affect an egress to an aisle of the aircraft cabin 102 from select aircraft seats 106 (e.g., narrow, partially or fully block, or the like). For example, as illustrated in FIGS. 4B-4E, the floor area 400 may only be located within select passenger compartments 100 (e.g., every-other or alternating passenger compartments 100), such that the positioning of the consolidated electronics packages 206 (e.g., within the floor areas 400) may be across from an opening of the passenger compartment 100 so as to not affect the egress to the aisle of the aircraft cabin 102 from the select passenger compartments 100 including the one or more consolidated electronics packages 206. It is noted herein the select passenger compartments 100 may be considered primary passenger compartments 100 with components installed within being considered primary components, for purposes of the disclosure. In addition, it is noted herein the non-select passenger compartments 100 may be considered auxiliary passenger compartments 100 with components installed within being considered auxiliary components, for purposes of the disclosure.

In this arrangement, the one or more electronics packages 206 may be configured to provide electrical connectivity (e.g., be coupled to electronics installed within) to a primary passenger compartment 100 including a primary aircraft seat 106 in front of the floor area 400 and an auxiliary passenger compartment 100 including an auxiliary aircraft seat 106 (and other auxiliary components, being installed in the auxiliary passenger compartment 100) behind the floor area 400, as indicated by the arrows 408. In this regard, the aircraft cabin 102 may require a fewer number of electronics packages 206.

Figure 4A:
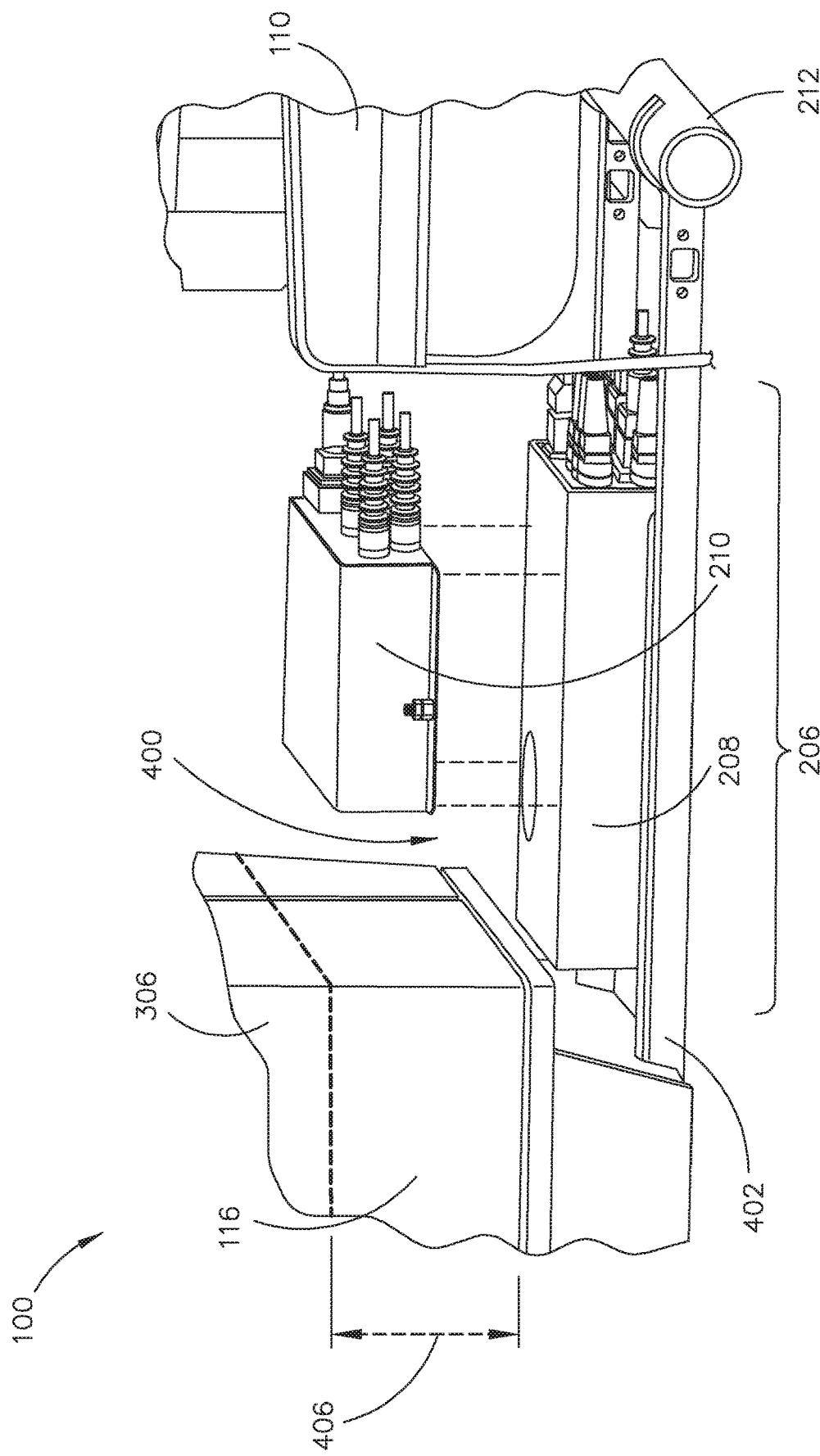
FIG. 4A illustrates a partial perspective view of a passenger compartment including consolidated electronics packages for staggered aircraft seats, in accordance with one or more embodiments of the disclosure.
Figure 4B:
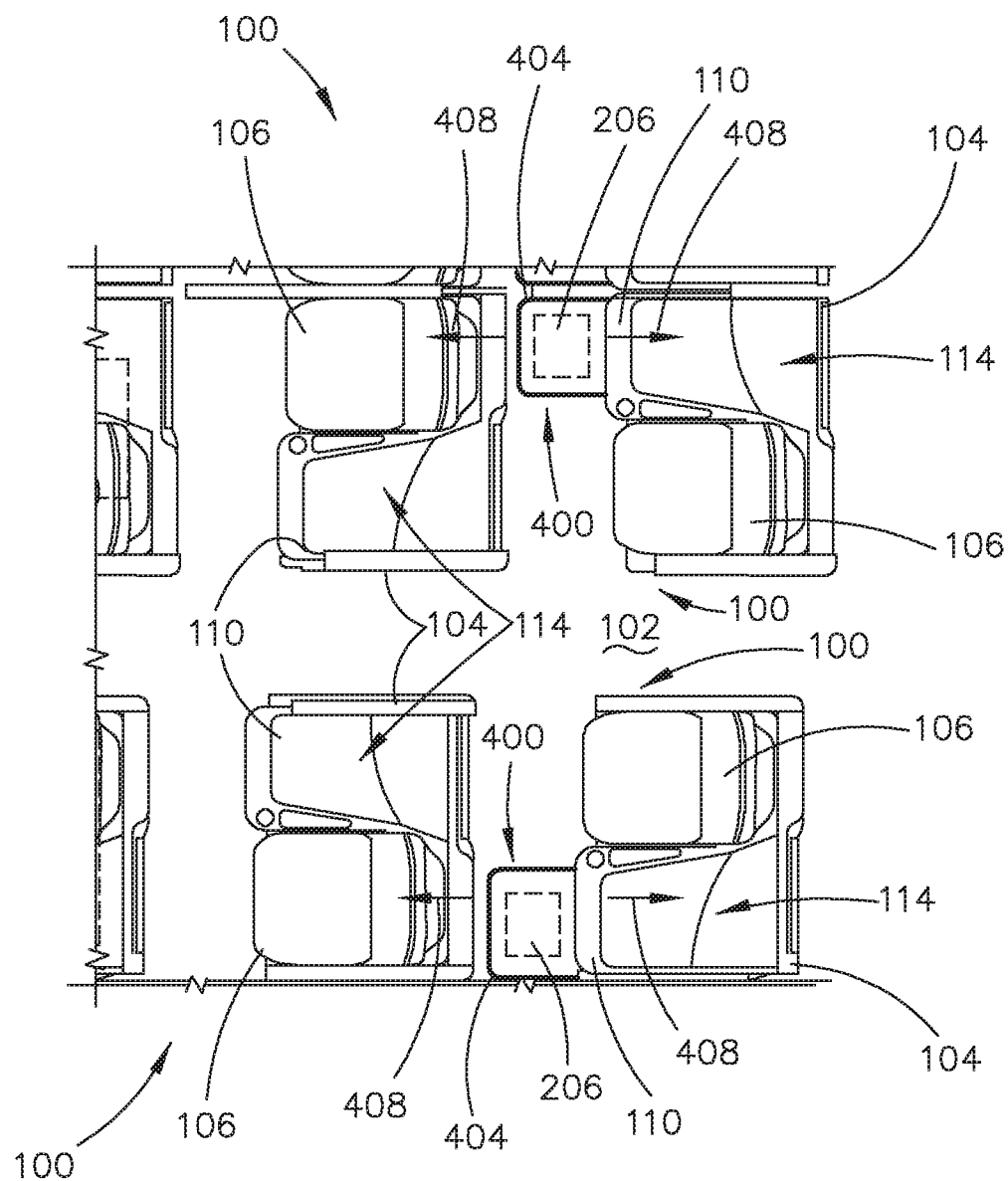
FIG. 4B illustrates a top plan view of a set of passenger compartments including staggered aircraft seats, in accordance with one or more embodiments of the disclosure.
Figure 4C:
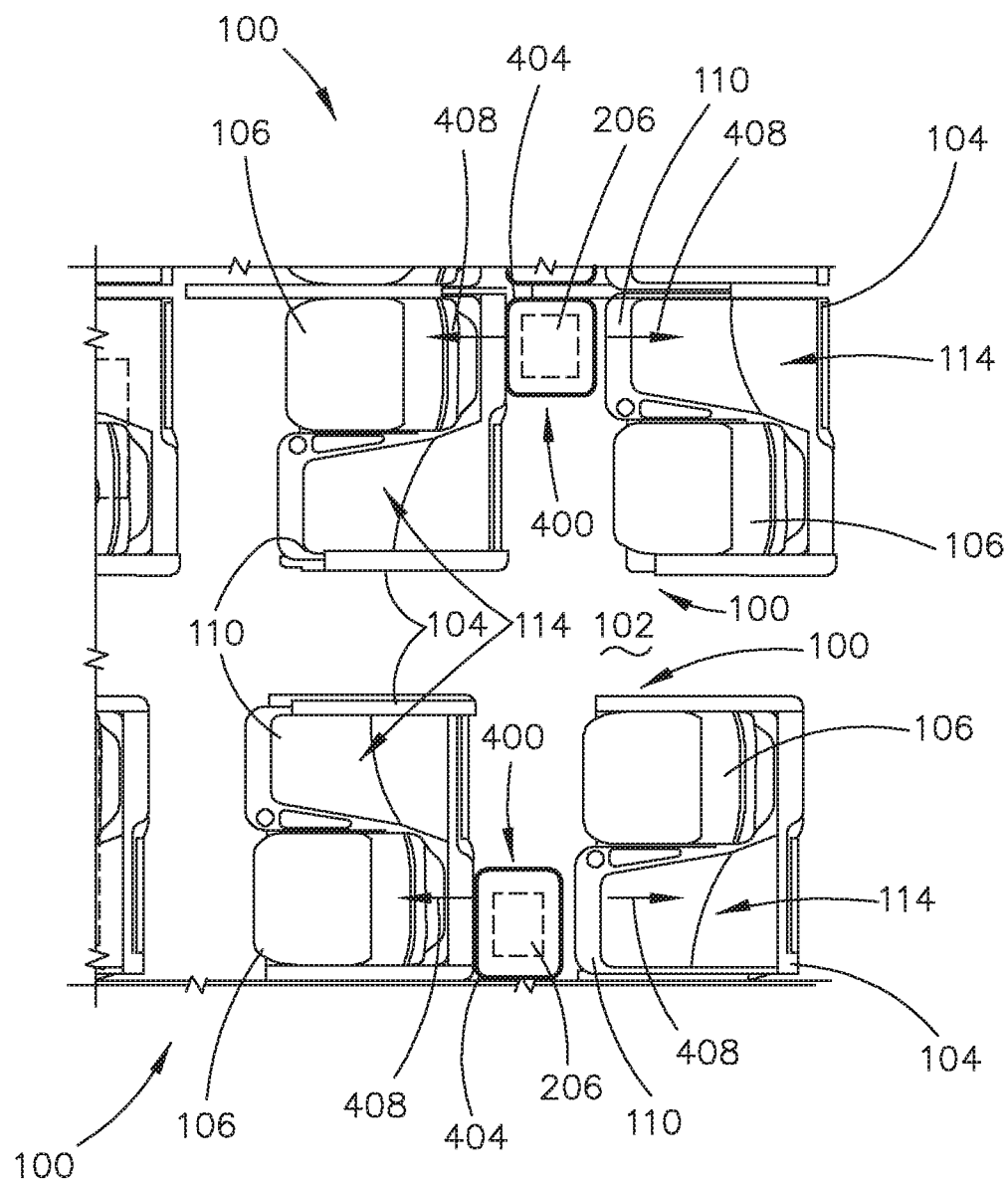
FIG. 4C illustrates a top plan view of a set of passenger compartments including staggered aircraft seats, in accordance with one or more embodiments of the disclosure.
Figure 4D:
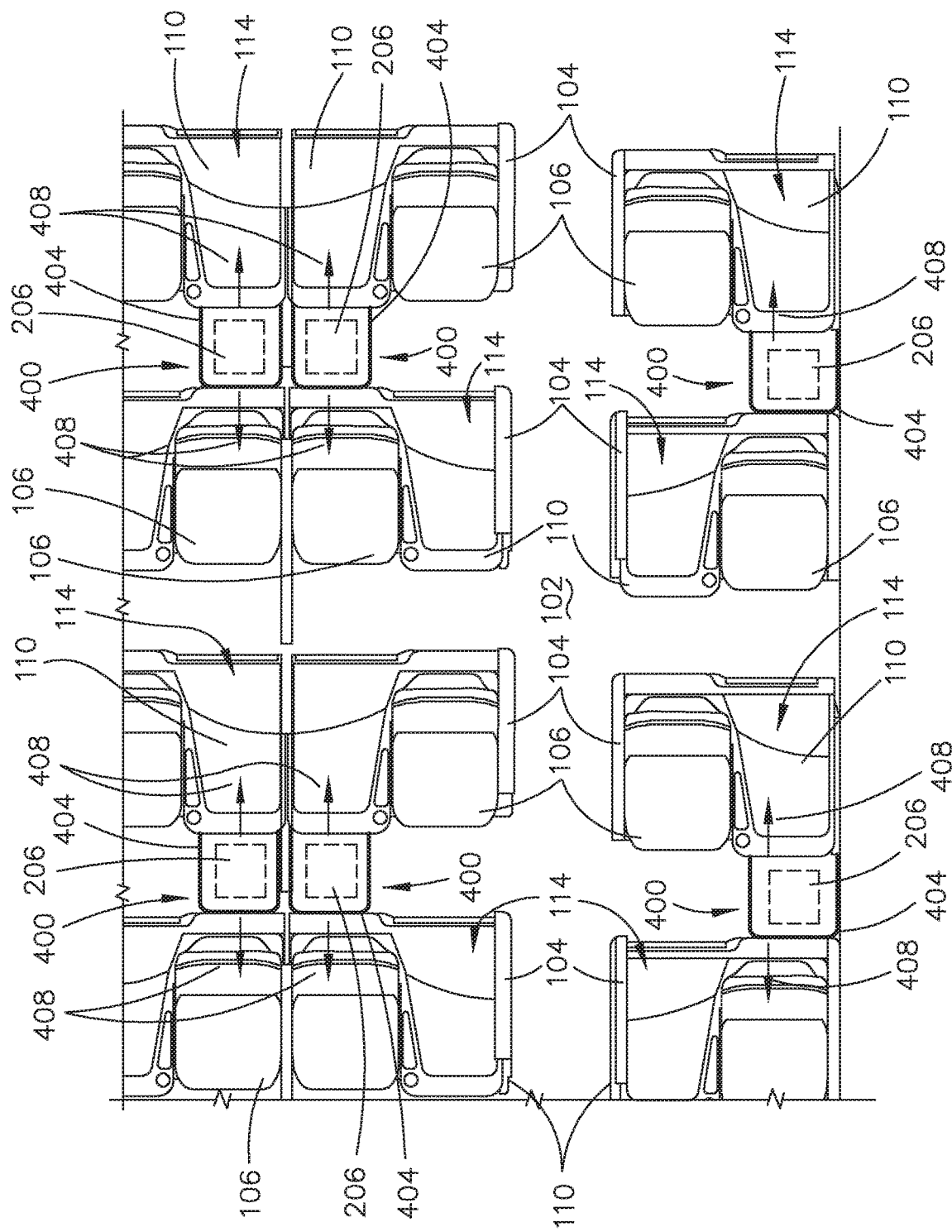
FIG. 4D illustrates a top plan view of a set of passenger compartments including staggered aircraft seats, in accordance with one or more embodiments of the disclosure.
Figure 4E:
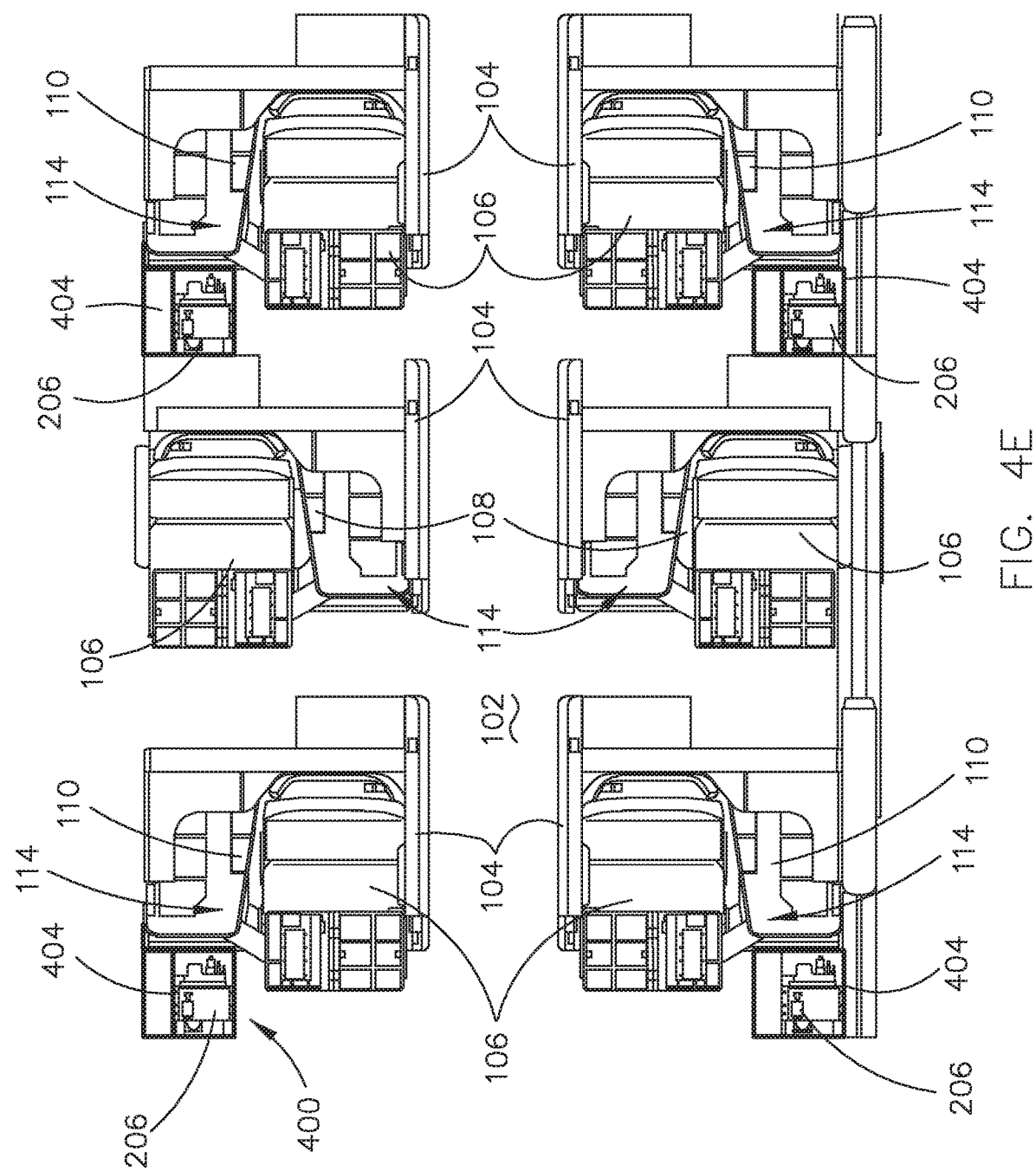
FIG. 4E illustrates a top plan view of a set of passenger compartments including staggered aircraft seats, in accordance with one or more embodiments of the disclosure.

It is noted herein there may exist a small gap between the plate or shield 404 covering the one or more electronics packages 206 (or the structure within the passenger compartment 100 covering the electronics packages 206) such that the floor area 400 may not be entirely covered (e.g., as illustrated in FIGS. 4B and 4C). Therefore, the above description should not be interpreted as a limitation on the present disclosure but merely an illustration.

The aircraft seats 106 in adjacent passenger compartments 100 may be set in a staggered arrangement within the aircraft cabin 102 relative to each other. It is noted herein this arrangement may require the aircraft seats 106 of a staggered arrangement within the aircraft cabin 102 to not be electrically connected from left to right.

For example, a primary passenger compartment 100 and an auxiliary passenger compartment 100 may each include an aircraft seat 106. For instance, the aircraft seats 106 in the primary passenger compartment 100 and the auxiliary passenger compartment 100 may face the same direction and be staggered. To allow for the staggering of the aircraft seats 106 in the primary passenger compartment 100 and the auxiliary passenger compartment 100, the aircraft seat 106 of the primary passenger compartment 100 may be positioned proximate to a primary monument 108 and/or an auxiliary monument 110, under which an ottoman 112 within a footwell 114 corresponding to the aircraft seat 106 of the auxiliary passenger compartment 100 may be positioned. In this regard, the amount of aircraft cabin 102 floor area necessary for the primary passenger compartment 100 and the auxiliary passenger compartment 100 may be reduced. It is noted herein, however, that the aircraft seats 106 in the primary passenger compartment 100 and the auxiliary passenger compartment 100 may not be staggered. In addition, it is noted herein that the aircraft seats 106 in the primary passenger compartment 100 and the auxiliary passenger compartment 100 may face different directions. Therefore, the above description should not be interpreted as a limitation on the present disclosure but merely an illustration.

By way of another example, a primary passenger compartment 100 and an auxiliary passenger compartment 100 may each include multiple aircraft seats 106. For instance, the multiple aircraft seats 106 within the primary passenger compartment 100 and the auxiliary passenger compartment 100 may be staggered. In addition, the multiple aircraft seats 106 within the primary passenger compartment 100 and the auxiliary passenger compartment 100 may be facing in different directions within the aircraft cabin 102. In this regard, the amount of aircraft cabin 102 floor area necessary for the primary passenger compartment 100 and the auxiliary passenger compartment 100 may be reduced. It is noted herein, however, that the multiple aircraft seats 106 within the primary passenger compartment 100 and the auxiliary passenger compartment 100 may not be staggered and/or may face in a similar or substantially similar direction. Therefore, the above description should not be interpreted as a limitation on the present disclosure but merely an illustration.

Although embodiments of the present disclosure describe example arrangements of passenger compartments 100 with included aircraft seats 106 within the aircraft cabin 102, it is noted herein any particular passenger compartment 100 with any particular aircraft seat 106 may be oriented in any direction within the aircraft cabin 102, and be oriented in any direction with respect to other passenger compartments 100 with other aircraft seats 106. Therefore, the above description should not be interpreted as a limitation on the present disclosure but merely an illustration.

In this regard, the consolidated electronics packages 206 may be located within the one or more passenger compartments 100 (and the aircraft cabin 102 in general) to reduce the loss of defined interior spaces usable for storage (e.g., within the ottoman 112, within the storage compartments 116, or the like) while maintaining an egress to an aisle of the aircraft cabin 102. The consolidated electronics packages 206 may be located within the passenger compartments 100 while still allowing for lowered primary monuments 108 and/or structures to provide an increased clearance to the passenger footwells 114 within the passenger compartments 100. The consolidated electronics packages 206 may reduce part count, fabrication cost, and/or installation cost in the passenger compartments 100 (and the aircraft cabin 102 in general).

The consolidated electronics packages 206 for staggered aircraft seats 106 may be installed in an aviation environment and may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

Although embodiments of the disclosure are directed to an aviation environment, it is noted herein the consolidated electronics packages 206 for staggered aircraft seats 106 are not limited to the aviation environment. For example, the consolidated electronics packages 206 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include an automobile. By way of another example, the consolidated electronics packages 206 may be coupled to and/or configured to operate with an apparatus sold for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft cabin system with a set of consolidated electronics packages for staggered aircraft seats, comprising:
   a primary passenger compartment of two or more passenger compartments;
   an auxiliary passenger compartment of the two or more passenger compartments adjacent to the primary passenger compartment and in a different row, a primary position of a primary aircraft seat of the primary passenger compartment staggered from an auxiliary position of an auxiliary aircraft seat of the auxiliary passenger compartment,
   the primary passenger compartment comprising:
      a floor;
      the primary aircraft seat positioned within the primary passenger compartment;

one or more elements, the one or more elements comprising:
  a primary monument;
  a primary passenger footwell that is:
    associated with the primary aircraft seat; at least partially defined by the one or more elements; and located at least partially below the primary monument and adjacent to the aircraft seat,
  a primary ottoman located at least partially below the primary monument, the primary ottoman comprising and defining a primary cavity;
  a structure positioned proximate to the primary passenger footwell; and
  a cavity defined by a surface of the structure and the floor and located adjacent to the floor and at least partially below the surface of the structure;
a first consolidated electronics package installed in the primary cavity of the primary ottoman, the primary ottoman further comprising and defining an auxiliary cavity configured as a storage space and located above the primary cavity, the primary ottoman corresponding to the primary aircraft seat of the primary passenger compartment; and
a second consolidated electronics package installed within the cavity of the structure,
the first consolidated electronics package and the second consolidated electronics package being configured to provide electrical connectivity to the primary passenger compartment and the auxiliary passenger compartment.

2. The aircraft cabin system of claim 1, the structure including a primary storage compartment, the cavity being defined between a bottom floor of the primary storage compartment of the primary passenger compartment and the floor of the primary passenger compartment, the primary storage compartment positioned proximate to the primary ottoman and the primary monument.

3. The aircraft cabin system of claim 2, the cavity defined between the bottom floor of the primary storage compartment and the floor of the primary passenger compartment being covered by a shield configured to prevent access to the second consolidated electronics package.

4. The aircraft cabin system of claim 1, the primary cavity defined within the primary ottoman and the auxiliary cavity defined within the primary ottoman being covered by a shield.

5. The aircraft cabin system of claim 1, the primary cavity defined within the primary ottoman being separated from the auxiliary cavity defined within the primary ottoman by a plate configured to prevent access to the first consolidated electronics package in the primary cavity.

6. The aircraft cabin system of claim 1, the first consolidated electronics package including a power box for in-flight entertainment devices installed within the primary passenger compartment and the auxiliary passenger compartment, the second consolidated electronics package including a power box for actuation devices of components installed within the primary passenger compartment and the auxiliary passenger compartment.

7. The aircraft cabin system of claim 1, the auxiliary passenger compartment including an auxiliary ottoman corresponding to the auxiliary aircraft seat, the auxiliary ottoman being installed under an auxiliary monument within the primary passenger compartment and positioned proximate to the primary aircraft seat.

* * * * *